Figure 1:
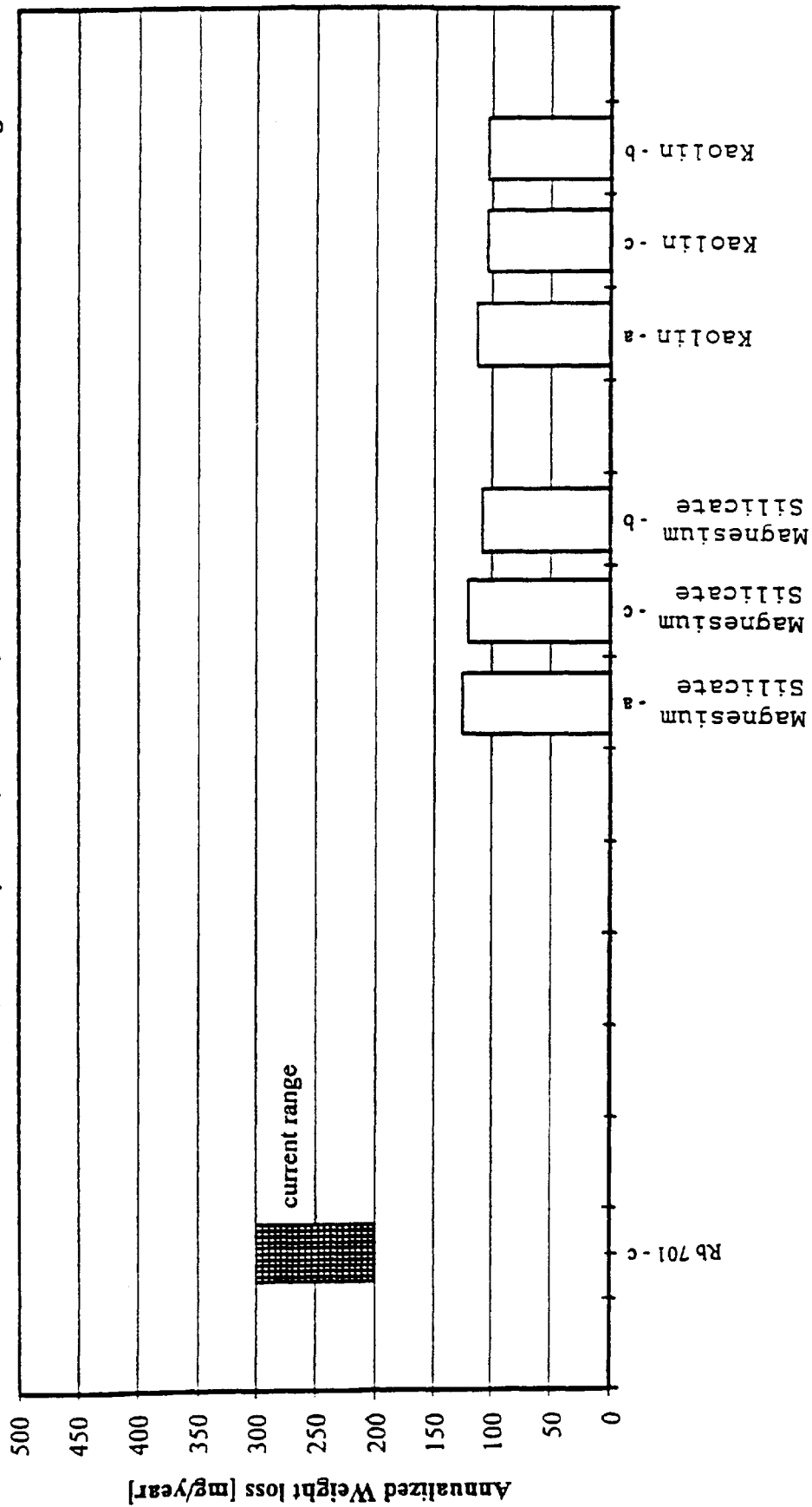

United States Patent [19]
Thomas

[11] Patent Number: 6,092,696
[45] Date of Patent: *Jul. 25, 2000

[54] DISPENSING APPARATUS FOR DISPENSING PRESSURIZED FLUID

[75] Inventor: Jonathan Thomas, King's Lynn, United Kingdom

[73] Assignee: Bespak PLC, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/952,751
[22] PCT Filed: Jun. 27, 1996
[86] PCT No.: PCT/GB96/01551
 § 371 Date: Dec. 4, 1997
 § 102(e) Date: Dec. 4, 1997
[87] PCT Pub. No.: WO97/01611
 PCT Pub. Date: Jan. 16, 1997

[30] Foreign Application Priority Data

Jun. 27, 1995 [GB] United Kingdom ............... 9513084

[51] Int. Cl.[7] .................................................. B65D 83/00
[52] U.S. Cl. ........................................................ 222/402.1
[58] Field of Search ...................... 222/402.1; 277/650, 277/935, 936, 943, 944, 945

[56] References Cited

U.S. PATENT DOCUMENTS

| 3,919,448 | 11/1975 | Dufresne .................................. 428/157 |
| 4,275,319 | 6/1981 | Davis, Jr. ............................ 428/519 X |
| 4,575,522 | 3/1996 | Breach et al. . |
| 5,290,539 | 3/1994 | Marecki . |
| 5,836,299 | 11/1998 | Kwon . |

FOREIGN PATENT DOCUMENTS

| A549568 | 1/1985 | France . |
| A2705951 | 12/1994 | France . |
| 2148912 | 6/1985 | United Kingdom . |
| WO 93/22221 | 11/1993 | WIPO . |
| WO 94/25373 | 11/1994 | WIPO . |
| WO 95/02651 | 1/1995 | WIPO . |
| WO 95/03984 | 2/1995 | WIPO . |

Primary Examiner—Philippe Derakshani
Attorney, Agent, or Firm—Smith, Gambrell & Russell, LLP

[57] ABSTRACT

Dispensing apparatus for dispensing pressurized fluid comprising a valve body defining a chamber and a valve member extending movably through the chamber, and through at least one annular seal co-operating with the valve member and the body to regulate the discharge of fluid. The seal is formed from a material comprising (a) a copolymer of ethylene and propylene or (b) a terpolymer of ethylene, propylene and a diene, or (c) a material selected from isobutylene isoprene, polychloroprene or fluorinated rubber. The seal may contain a mineral filler.

11 Claims, 2 Drawing Sheets

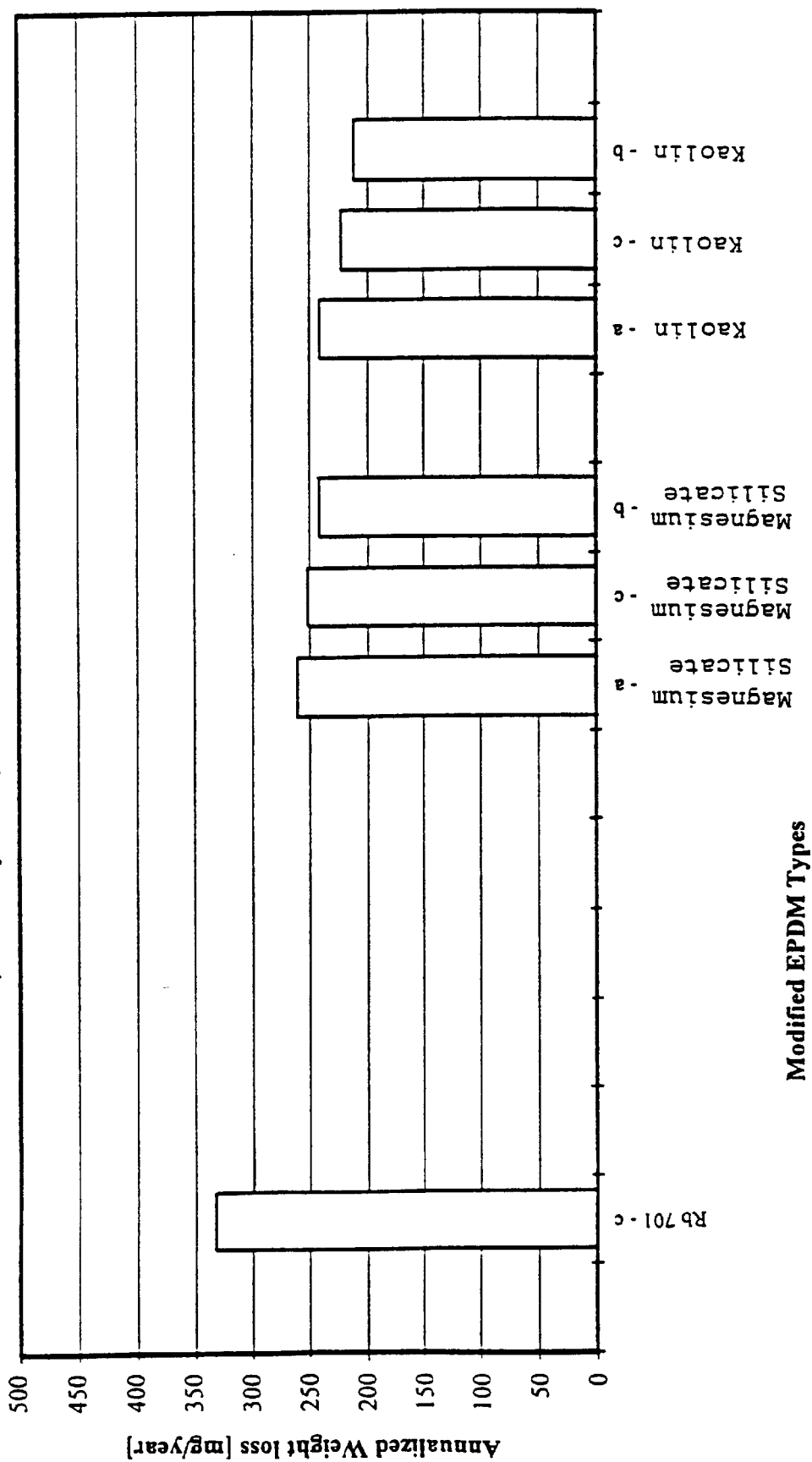

DISPENSING APPARATUS FOR DISPENSING PRESSURIZED FLUID

This invention relates to a dispensing apparatus for dispensing pressurised fluid in the form of an aerosol and in particular but not exclusively for dispensing medicine or products in solution or suspension in an alcohol base.

It is known from GB-1201918 for example to provide dispensing apparatus in which pressurised fluid from a pressurised dispensing container is released by a valve in a controlled manner, the valve including elastomeric seals which are annular and which co-operate with a sliding valve stem to open and close fluid ports.

Products to be dispensed are commonly provided in solution or suspension in an alcohol base, this being particularly common in the dispensing of medicinal compounds for inhalation therapy.

Typical apparatus includes a CFC volatile propellant having a liquid phase in which the product together with the alcohol carrier is readily soluble within the container and a typical material for the valve seal is a synthetic rubber such as nitrile rubber.

Recent trends in the production of aerosol dispensers have moved away from CFC propellants because of their environmental hazards and HFC propellants are now being introduced. A problem with such propellants is that alcohol is less soluble in the liquid phase of such propellants and tends to separate within the container thereby exposing the valve seals to a much greater concentration of alcohol than was formerly the case. Seal materials such as nitrile rubber allow alcohol vapour to escape by permeation over extended storage periods so that the remaining quantity of alcohol is significantly depleted.

It is an object of the present invention to provide dispensing apparatus which will allow the use of HFC propellants with alcohol based products without the above disadvantage.

According to the present invention there is disclosed dispensing apparatus for dispensing pressurised fluid comprising a valve body defining a chamber, a valve member extending movably through the chamber and through at least one annular seal co-operating with the valve member and the body to regulate the discharge of fluid, wherein the or at least one of the seals is formed from a material comprising (a) a copolymer of ethylene and propylene or (b) a terpolymer of ethylene, propylene and a diene, or (c) a material selected from isobutylene isoprene, polychloroprene or a fluorinated rubber.

It has been found that the extent to which alcohol evaporates from such apparatus using such seal materials is significantly decreased so that typically a required shelf life of three years can be readily achieved.

Preferably the material comprises a peroxide curing agent.

A peroxide curing agent such as dicumyl peroxide is preferable to other curing agents such as sulphur since its use minimises the formation of extractives (e.g. 2-mercaptobenzothiazole, N-nitrosamines, mercaptobenzothiazole disulphide) resulting from contact between the material and alcohol in use.

Preferably the seal material comprises a mineral filler.

Mineral fillers are preferable to carbon black in order to minimise the formation of polynuclear aromatic hydrocarbon compounds.

Advantageously the mineral filler is selected from the group comprising magnesium silicate, aluminium silicate, silica titanium oxide, zinc oxide, calcium carbonate, magnesium carbonate, magnesium aluminium silicate, aluminium hydroxide, talc, kaolin and clay. Preferably the filler is magnesium silicate or kaolin.

Preferably the apparatus comprises a pressurised dispensing container operatively connected to the valve body and containing the fluid to be dispensed and a hydrofluorocarbon propellant comprising propellant type 134a or 227.

(The designation of propellant types referred to in the present application is as specified in British Standard BS4580:1970 "Specification for number designations of organic refrigerants". Accordingly, propellant 134a is:

1,1,1,2-Tetrafluoroethane $CH_2F—CF_3$ and propellant 227 is:

1,1,1,2,3,3,3 Heptafluoropropane $CF_3—CHF—CF_3$).

Typically the fluid to be dispensed comprises a liquid or particulate product as a solution or suspension in a carrier liquid comprising an alcohol such as ethanol.

A preferred embodiment of the present invention will now be described by way of example.

In a pressurised dispensing container of the type disclosed in GB-1201918, a valve body is provided with two annular valve seals through which a valve member is axially slidable, the seals being disposed at inlet and outlet apertures of a valve chamber so that the valve functions as a metering valve.

In accordance with the present invention the seals are formed from a material comprising a copolymer of ethylene and propylene (EPM) cured using dicumyl peroxide as curing agent and containing magnesium silicate as a filler.

Satisfactory results have been obtained using such seals where the fluid to be dispensed comprises up to 50% by weight of ethanol and the propellant is of type 134a.

It has also been found that seals formed from a terpolymer of ethylene, propylene and a diene (EPDM) show substantially improved leakage characteristics using magnesium silicate or kaolin as a filler. This is illustrated with reference to FIG. 1 and 2 which are graphs showing weight loss of test devices under two different temperature testing regimes AT 30° C. and 40° C. respectively.

In each case, the columns show weight loss from a dispensing device of the type described above in which the containers were filled with propellant 134A ethanol and an active compound. The first column in each case shows the weight loss using a current EPDM material sold under the commercial name RB701C and which contains Ultrasil filler. The remaining columns show weight loss of corresponding devices using magnesium silicate or kaolin as fillers. The respective fillers are indicated on the columns of the graphs.

In each case, the left hand axis shows annualised weight loss calculated from tests with groups of ten dispensing devices as time interval of 3 to 6 months after manufacturing and under different temperature regimes as indicated in the headings to the graphs.

These tests show that using magnesium silicate or koalin as a filler leads to a reduced weight loss under the test regimes thus indicating lower leakage from the devices. Similar results are obtained at ambient temperatures.

What is claimed is:

1. A dispensing apparatus for dispensing a pressurized fluid, comprising:

a valve body defining a chamber; and a valve member extending movably through the chamber and through at least one annular seal disposed between the valve member and the body to regulate the discharge of fluid, wherein the or at least one of the seals is formed from a material comprising isobutylene isoprene rubber, polychloroprene or a fluorinated rubber, and the seal material comprises a mineral filler comprising magnesium silicate.

2. The dispensing apparatus according to claim 1, wherein the mineral filler further comprises kaolin.

3. A dispensing apparatus for dispensing a pressurized fluid, comprising:

a valve body defining a chamber; and a valve member extending movably through the chamber and through at least one annular seal disposed between the valve member and the body to regulate the discharge of fluid, wherein the or at least one of the seals is formed from a material comprising a copolymer of ethylene and propylene, and the seal material comprises a mineral filler comprising at least one member selected from the group consisting of magnesium silicate, kaolin and silica.

4. The dispensing apparatus according to claim 3, wherein the mineral filler comprises magnesium silicate and kaolin.

5. The dispensing apparatus according to claim 4, wherein the mineral filler comprises magnesium silicate, kaolin and silica.

6. The dispensing apparatus according to claim 1, further comprising a pressurized dispensing container operatively connected to the valve body and containing the fluid to be dispensed, and comprising at least one hydrofluorocarbon propellant selected from the group consisting of propellant type 134a and propellant type 227.

7. The dispensing apparatus according to claim 3, further comprising a pressurized dispensing container operatively connected to the valve body and containing the fluid to be dispensed, and comprising at least one hydrofluorocarbon propellant selected from the group consisting of propellant type 134a and propellant type 227.

8. The dispensing apparatus according to claim 6, wherein the fluid to be dispensed comprises a liquid or particulate product as a solution or suspension in a carrier liquid comprising alcohol.

9. The dispensing apparatus according to claim 7, wherein the fluid to be dispensed comprises a liquid or particulate product as a solution or suspension in a carrier liquid comprising alcohol.

10. The dispensing apparatus according to claim 8, wherein the alcohol comprises ethanol.

11. The dispensing apparatus according to claim 9, wherein the alcohol comprises ethanol.

\* \* \* \* \*